US005551776A

United States Patent [19]

Zimmerman

[11] Patent Number: 5,551,776

[45] Date of Patent: Sep. 3, 1996

[54] TELESCOPING DISCHARGE CHUTE FOR CONCRETE TRUCKS

[76] Inventor: Harold M. Zimmerman, R.D. #1, Wabash Rd., Ephrata, Pa. 17522

[21] Appl. No.: 413,383

[22] Filed: Mar. 30, 1995

[51] Int. Cl.[6] .............................. B28C 7/16; B65G 11/14

[52] U.S. Cl. .............................. 366/68; 366/49; 193/6; 414/523

[58] Field of Search .............................. 366/33, 50, 68, 366/189, 194–196, 27, 37, 42, 6, 8, 34, 64, 49, 186; 193/4, 6, 10, 15, 16; 414/503, 504, 505, 523

[56] References Cited

U.S. PATENT DOCUMENTS

| | | | |
|---|---|---|---|
| 2,968,382 | 1/1961 | Oury | 193/10 |
| 3,157,262 | 11/1964 | Chapdelaine | 193/10 |
| 3,310,293 | 3/1967 | Zimmerman | 366/6 |
| 3,633,879 | 1/1972 | Prichard | 366/68 |
| 3,930,567 | 1/1976 | Sims | 193/10 |
| 4,009,868 | 3/1977 | Blind | 366/68 X |
| 4,047,604 | 9/1977 | Daoust | 193/10 |
| 4,406,548 | 9/1983 | Haws | 366/37 X |
| 4,711,334 | 12/1987 | Barry et al. | 193/10 X |
| 5,035,313 | 7/1991 | Smith | 193/5 X |
| 5,178,252 | 1/1993 | Smith | 193/6 X |
| 5,192,178 | 3/1993 | Silbernagel | 366/68 |

*Primary Examiner*—Charles E. Cooley

[57] ABSTRACT

A telescopible discharge chute apparatus for a mobile concrete production machine is movable into a transport position located within the lateral confines of the concrete truck. The telescopible discharge chute apparatus utilizes individual chute sections that are substantially equal to the lateral width of the concrete truck such that the maximum effective length of the fully extended discharge chute is approximately twenty feet. One embodiment of the invention positions the generally vertical pivot axis for the discharge chute apparatus at a lateral side of the concrete truck to enable the transport width of the discharge chute apparatus to utilize the entire width of the concrete truck, while a cross conveyor is operable to transport the concrete mixture from a central, front discharge concrete drum to the discharge chute hopper. A second embodiment of the invention utilizes a half-sized chute section fixed to a central pivoted hopper to receive the concrete mixture directly from the central, front discharge concrete drum, while the telescopible discharge chute apparatus is slidable along the fixed chute section to enable the discharge chute apparatus to be placed into a transport position within the lateral confines of the concrete truck.

20 Claims, 9 Drawing Sheets

TELESCOPING DISCHARGE CHUTE FOR CONCRETE TRUCKS

BACKGROUND OF THE INVENTION

This invention relates generally to mobile machines for mixing concrete on-site, and more particularly, to a discharge chute apparatus for use on concrete trucks.

Concrete trucks, such as that described in U.S. Pat. No. 3,310,293, issuing to Harold M. Zimmerman on Mar. 21, 1967, and U.S. Pat. No. 4,406,548, issuing to Paul M. Haws on Sep. 27, 1983, carry supplies, such as aggregate, cement and water, in discrete hoppers from which the supplies are drawn in predetermined ratios to be deposited in a mixing auger apparatus where the combined supplies are mixed and turned into concrete to be discharged from the mixing auger externally of the concrete truck. This mixing auger apparatus is formed from a generally semi-circular flexible housing against which a standard pitch, spiral flighted auger works to not only mix the combined supplies, but to convey the combined supplies, and ultimately the created concrete, to the remote discharge end of the auger.

Other conventional concrete mixer trucks utilize a mixer drum rotatably mounted on the vehicle frame. These drums usually receive a charge of pre-mixed concrete from a central mixing plant and are rotatable to keep the concrete mixture agitated until delivered to the job site. As depicted in U.S. Pat. No. 5,192,178, granted on Mar. 9, 1993, the more modern configurations of these mixer drums orient the discharge opening at a central forward position relative to the vehicle frame to provide the operator located in the operator's cab to control the discharge and delivery of the mixed concrete through a front-mounted discharge chute mechanism without leaving the cab of the truck.

The utilization of the front discharge mixer drums restricts the configuration of the discharge chute apparatus. The discharge chute is preferably operable to deliver the concrete mixture to a distal discharge point that is variable by extending the length of the chute and by swinging the discharge chute apparatus along a generally horizontal range of operation. Improvements have been made in discharge chutes to maximize the overall length of the discharge chute apparatus when in the storage or transport position. For example, U.S. Pat. No. 2,968,382, granted on Jan. 17, 1961, is representative of a pivotal discharge chute frame that positions the discharge chute in an inoperative storage position within the lateral confines of the vehicle. Other collapsible discharge chutes are depicted in the fold-up version of U.S. Pat. No. 3,930,567, granted on Jan. 6, 1976, and in the telescopic version of U.S. Pat. No. 3,157,262, granted on Nov. 17, 1964.

None of the known discharge chutes for concrete trucks combine a maximizing of the effective overall length of the discharge chute with a transport orientation that collapses the entire length of the discharge chute within the limits of the lateral confines of the concrete truck. It would be desirable to provide a discharge chute apparatus that provides a telescopible operation to provide a substantially infinite variation in the position at which the concrete mixture is discharged, up to the maximum length of the discharge chute apparatus, while utilizing telescoping chute sections whose individual length is substantially equal to the overall width of the concrete truck.

SUMMARY OF THE INVENTION

It is an object of this invention to overcome the aforementioned disadvantages of the prior art by providing a discharge chute apparatus that maximizes the effective operable length of the discharge chute, while enabling the entire discharge chute apparatus to be collapsed in a transport position confined within the lateral limits of a concrete mixer truck.

It is another object of this invention to provide a telescopible discharge chute apparatus for a concrete mixer truck that utilizes individual telescoping chute sections that are essentially as long as the lateral width of the concrete truck.

It is still another object of this invention to provide a mechanism to effect the telescoping movement of the discharge chute apparatus.

It is a feature of this invention that the discharge chute apparatus can be oriented into a transport position that does not exceed the overall width of the concrete truck.

It is an advantage of this invention that the discharge chute apparatus can be operated remotely throughout the entire range of operation thereof.

It is another advantage of this invention that the total effective length of the discharge chute apparatus can approach 20 feet without manually adding chute sections.

It is another feature of this invention that the discharge chute apparatus can be operably associated with both the pre-mix type of concrete trucks and the on-site type of concrete trucks.

It is still another feature of one embodiment of the invention that the generally vertical pivot axis to provide the generally horizontal range of operation for the discharge chute apparatus is located at a lateral side of the concrete truck.

It is yet another feature of the one embodiment of this invention that a cross-conveyor can transport the concrete mixture from a central, front discharge mixer drum to the laterally pivoted discharge chute apparatus.

It is a further feature of another embodiment of this invention that the telescopible discharge chute apparatus is mounted on a fixed chute section pivotally supported at the forward center of the concrete truck to receive the concrete mixture from the central, front discharge mixer drum.

It is still another advantage of this invention that the telescopible discharge chute apparatus is slidable along the fixed chute section to enable the telescopible discharge chute apparatus to be placed into a transport position within the lateral confines of the concrete truck.

It is yet another object of this invention to provide a discharge chute apparatus for a concrete mixer machine which is durable in construction, inexpensive of manufacture, carefree of maintenance, facile in assemblage, and simple and effective in use.

These and other objects, features and advantages are accomplished according to the instant invention by providing a telescopible discharge chute apparatus for a mobile concrete production machine wherein the discharge chute apparatus is movable into a transport position located within the lateral confines of the concrete truck. The telescopible discharge chute apparatus utilizes individual chute sections that are substantially equal to the lateral width of the concrete truck such that the maximum effective length of the fully extended discharge chute is approximately twenty feet. One embodiment of the invention positions the generally vertical pivot axis for the discharge chute apparatus at a lateral side of the concrete truck to enable the transport width of the discharge chute apparatus to utilize the entire width of the concrete truck, while a cross conveyor is operable to transport the concrete mixture from a central, front discharge concrete drum to the discharge chute hopper. A second embodiment of the invention utilizes a half-sized chute section fixed to a central pivoted hopper to receive the concrete mixture directly from the central, front discharge concrete drum, while the telescopible discharge chute apparatus is slidable along the fixed chute section to enable the discharge chute apparatus to be placed into a transport position within the lateral confines of the concrete truck.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
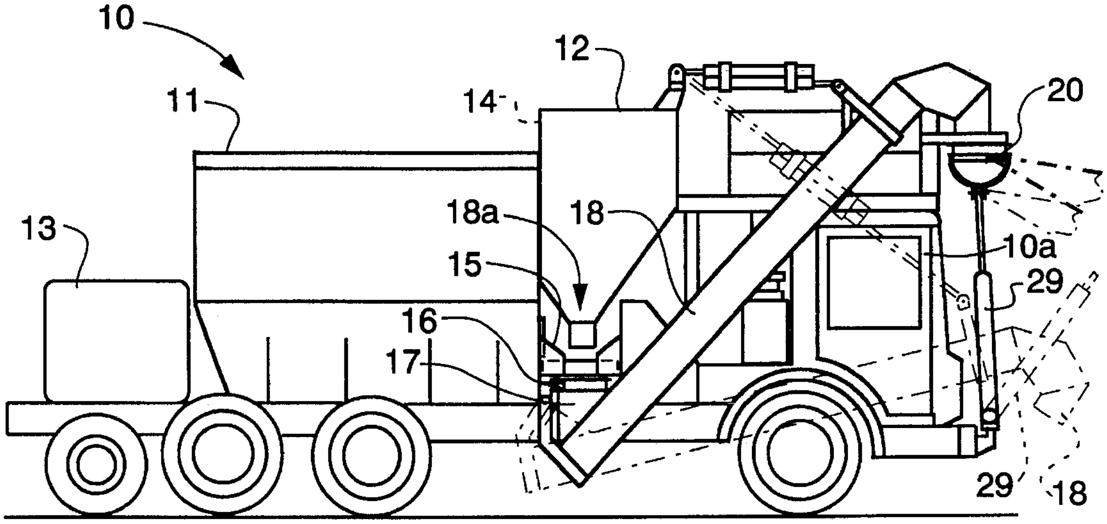
FIG. 1 is a side elevational view of a mobile concrete mixer incorporating the principles of the instant invention, the vertical pivotal movement of both the mixing auger and the discharge chute apparatus being shown in phantom.
Figure 2:
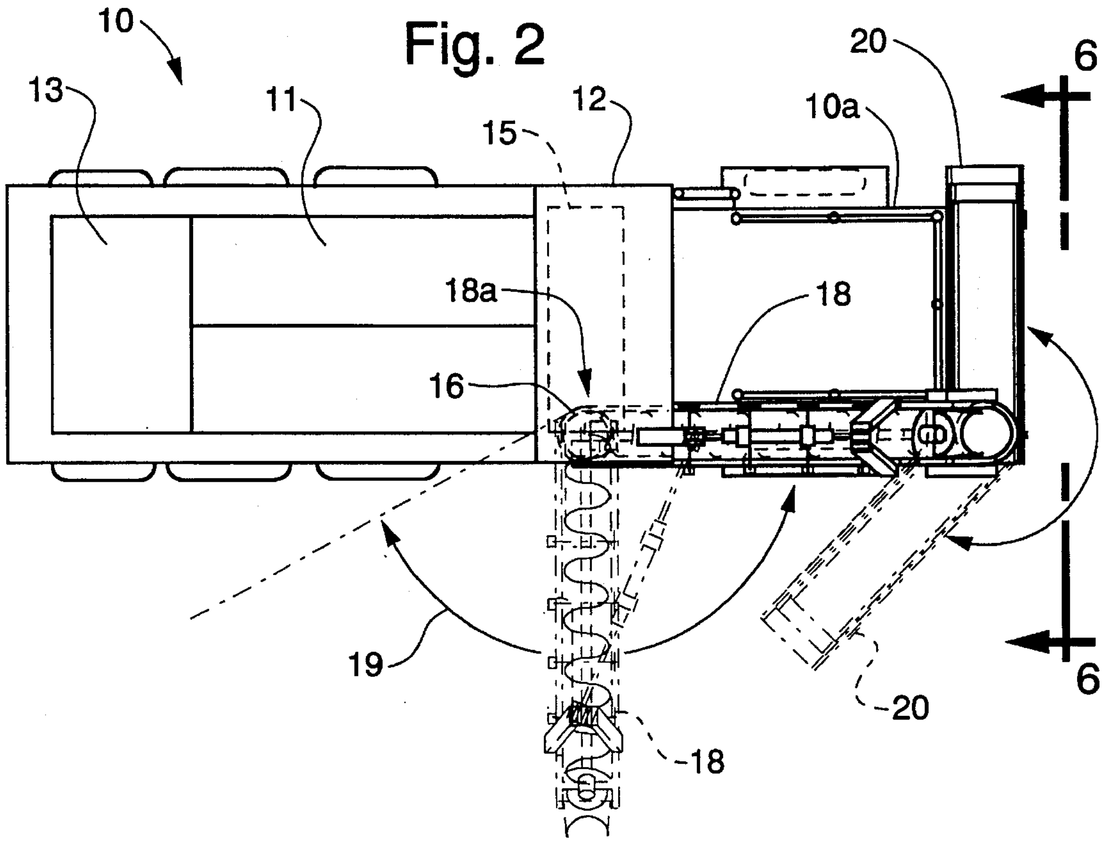
FIG. 2 is a top plan view of the mobile concrete mixer shown in FIG. 1, the generally horizontal pivotal movements of both the mixing auger and the discharge chute apparatus, defining the respective ranges of operation, being shown in phantom.
Figure 3:
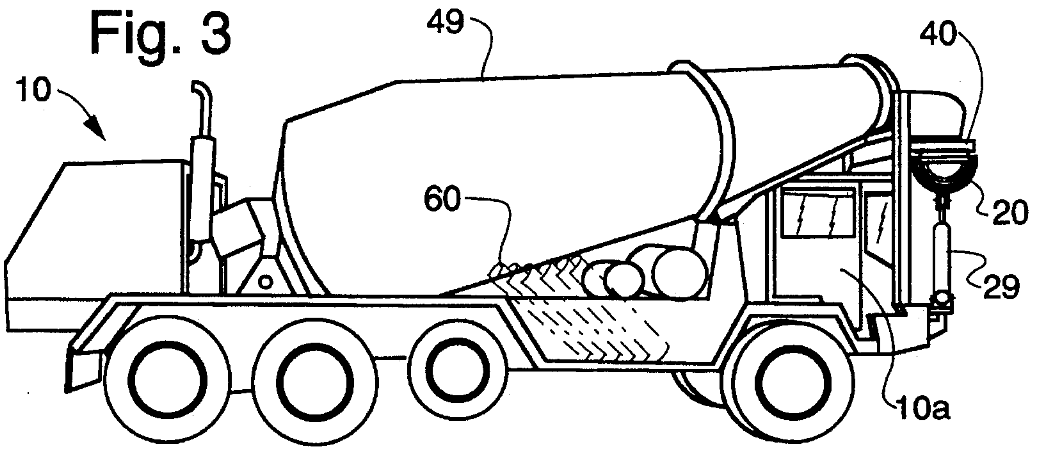
FIG. 3 is a side elevational view of a second embodiment of a mobile concrete mixer having a front discharge drum.
Figure 4:
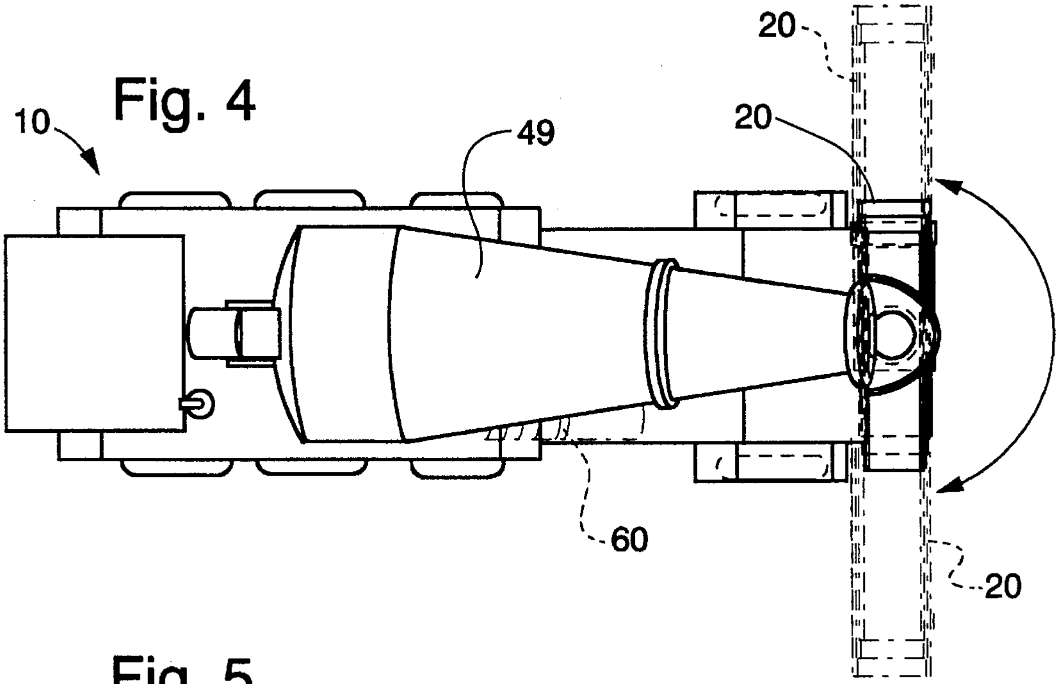
FIG. 4 is a top plan view of the mobile concrete mixer shown in FIG. 3, the generally horizontal pivotal movements of the discharge chute apparatus, defining the range of operation thereof, being shown in phantom.

Referring now to the drawings and, particularly, to FIGS. 1 and 2, a representative side elevational and top plan views of a mobile concrete mixer incorporating the principles of the instant invention can best be seen. Left and right references are used as a matter of convenience and are determined by standing at the rear of the concrete mixer and facing the forward end, where the operator's cab **10*a* is positioned, in the normal direction of travel. The mobile concrete mixer 10 is of the type carrying segregated supplies of component materials for the production of concrete, including aggregate in a first hopper 11, cement in a second hopper 12, water in a third hopper 13, and additives in a fourth hopper 14, which are delivered to a mixing auger apparatus 18 in preselected proportions for the on-site production of a concrete mix. The general details of the operation of an on-site concrete mixer 10** can be found in U.S. Pat. No. 3,310,293, issued to Harold M. Zimmerman on Mar. 21, 1967, the descriptive portions of which are incorporated herein by reference.

A conveyor mechanism 15 delivers the component materials to a receiving ring 16 pivotally supporting the mixing auger apparatus 18 at a lateral side of the vehicle 10. The receiving ring 16 includes a fixed shroud 17 that funnels the component materials into the infeed opening **18*a* of the mixing auger apparatus 18. The receiving ring 16 is rotatable in a known manner to permit rotational movement of the mixing auger apparatus 18 from a first operative position shown in solid lines in FIGS. 1 and 2 through a range of operation laterally of the vehicle 10 as indicated by the arrow 19. In the normal, first operative position, the mixing auger apparatus 18 is operable to discharge a concrete mixture into a discharge chute mechanism 20 for purposes to be described in greater detail below. The structural and operative details of the mixing auger apparatus 18** are disclosed in U.S. Pat. No. 5,486,047, granted to Harold M. Zimmerman on Jan. 23, 1996, and entitled "Mixing Auger for Concrete Trucks", the descriptive portions of which are incorporated herein by reference.

Figure 9:
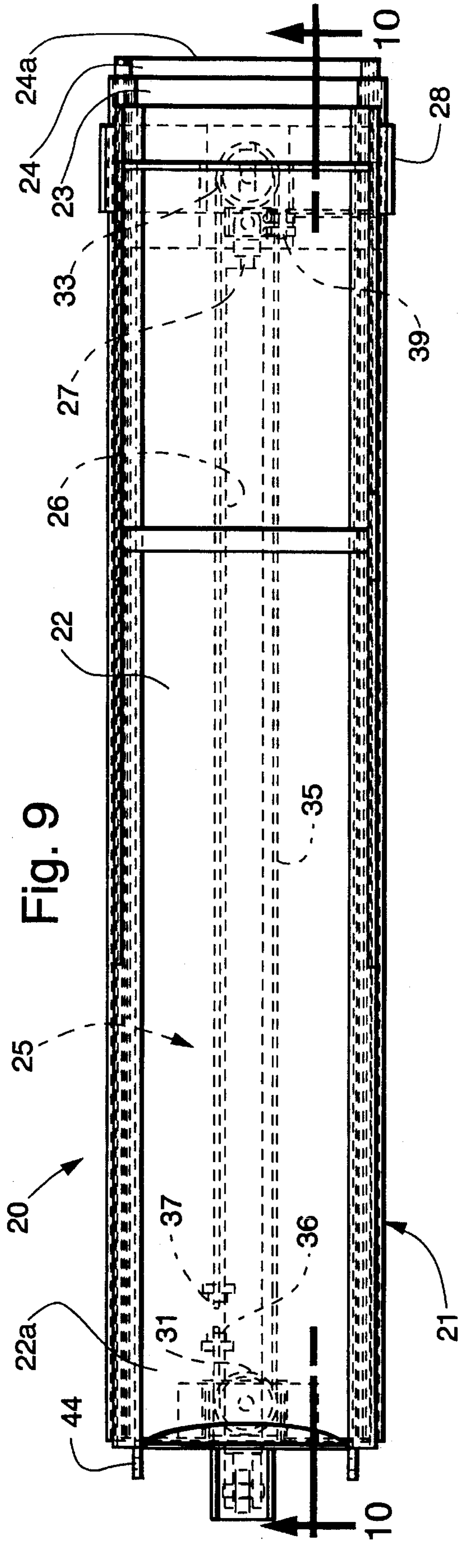
FIG. 9 is a top plan view of the telescopic discharge chute apparatus.
Figure 10:
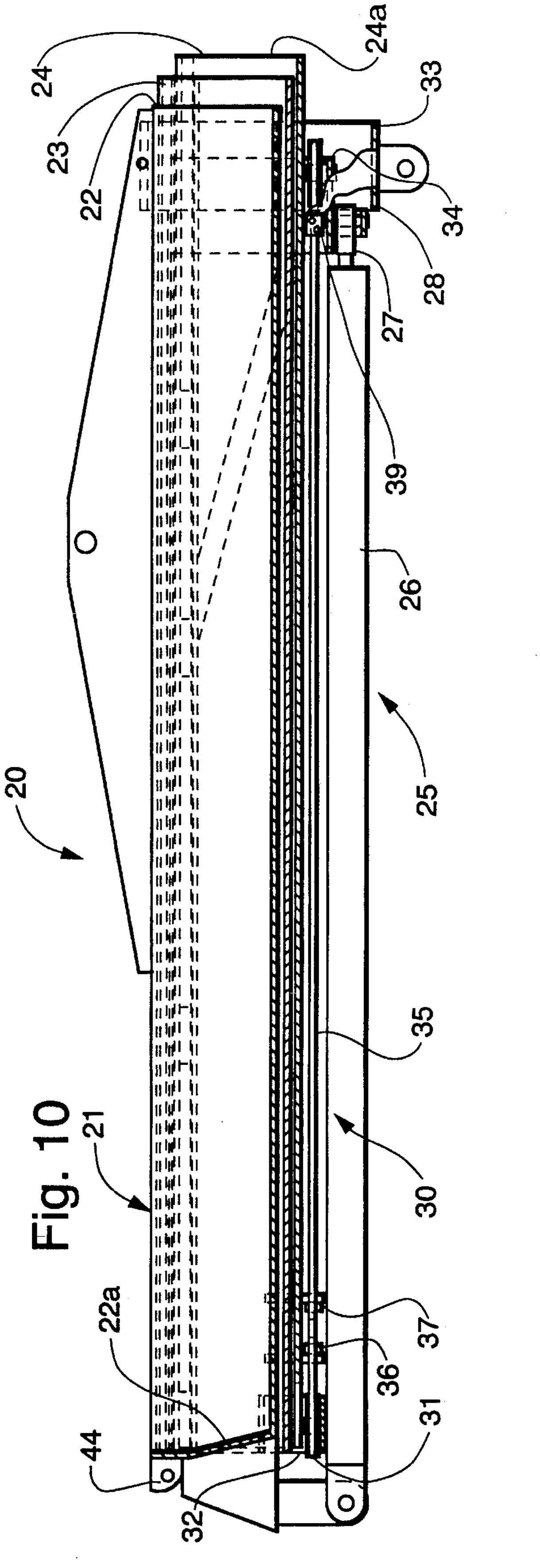
FIG. 10 is a cross-sectional view of the discharge chute apparatus taken along lines 10—10 of FIG. 9.
Figure 11:
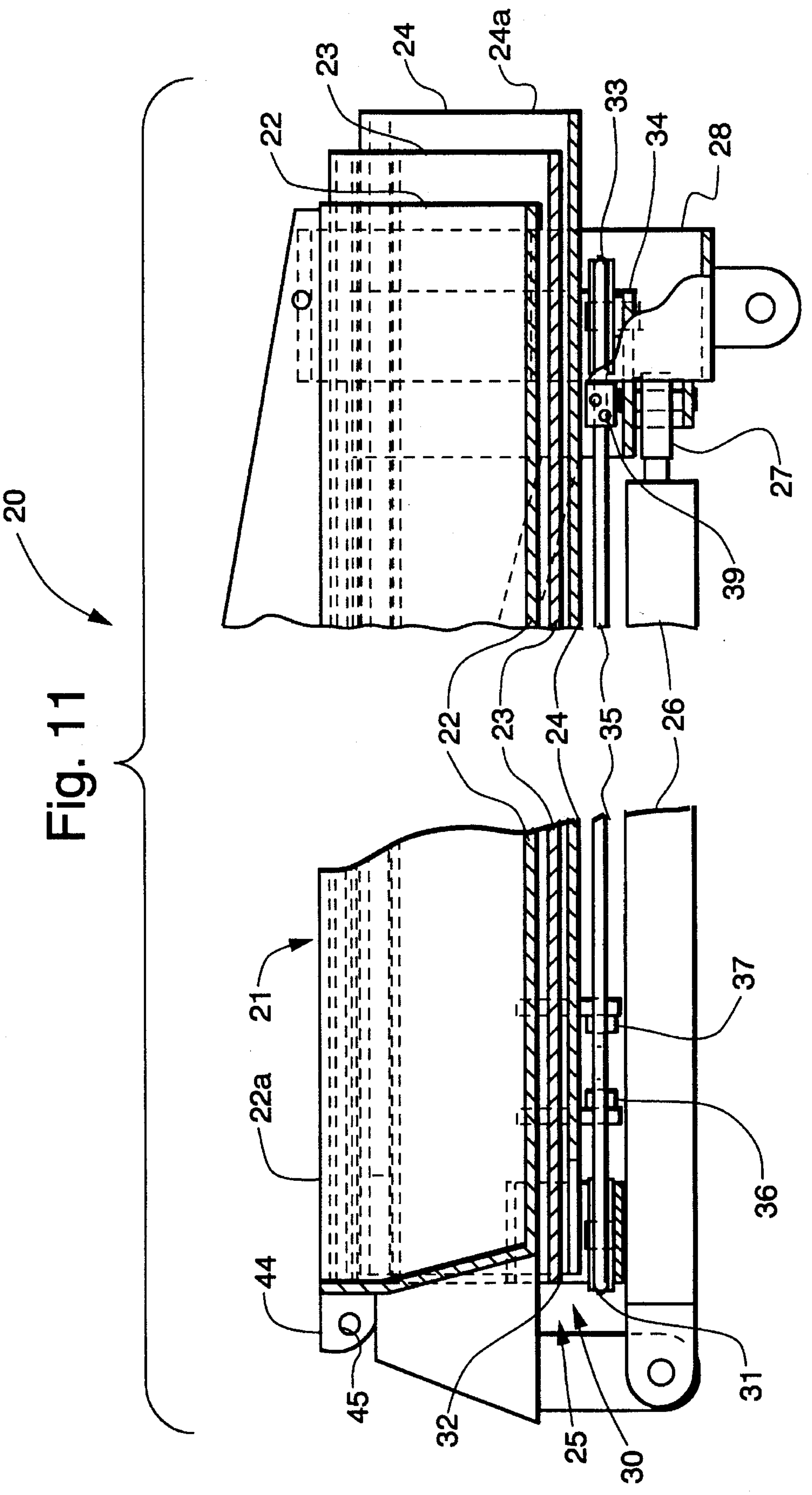
FIG. 11 is an enlarged cross-sectional view of the discharge chute apparatus corresponding to FIG. 10 with the central portion being broken away.
Figure 14:
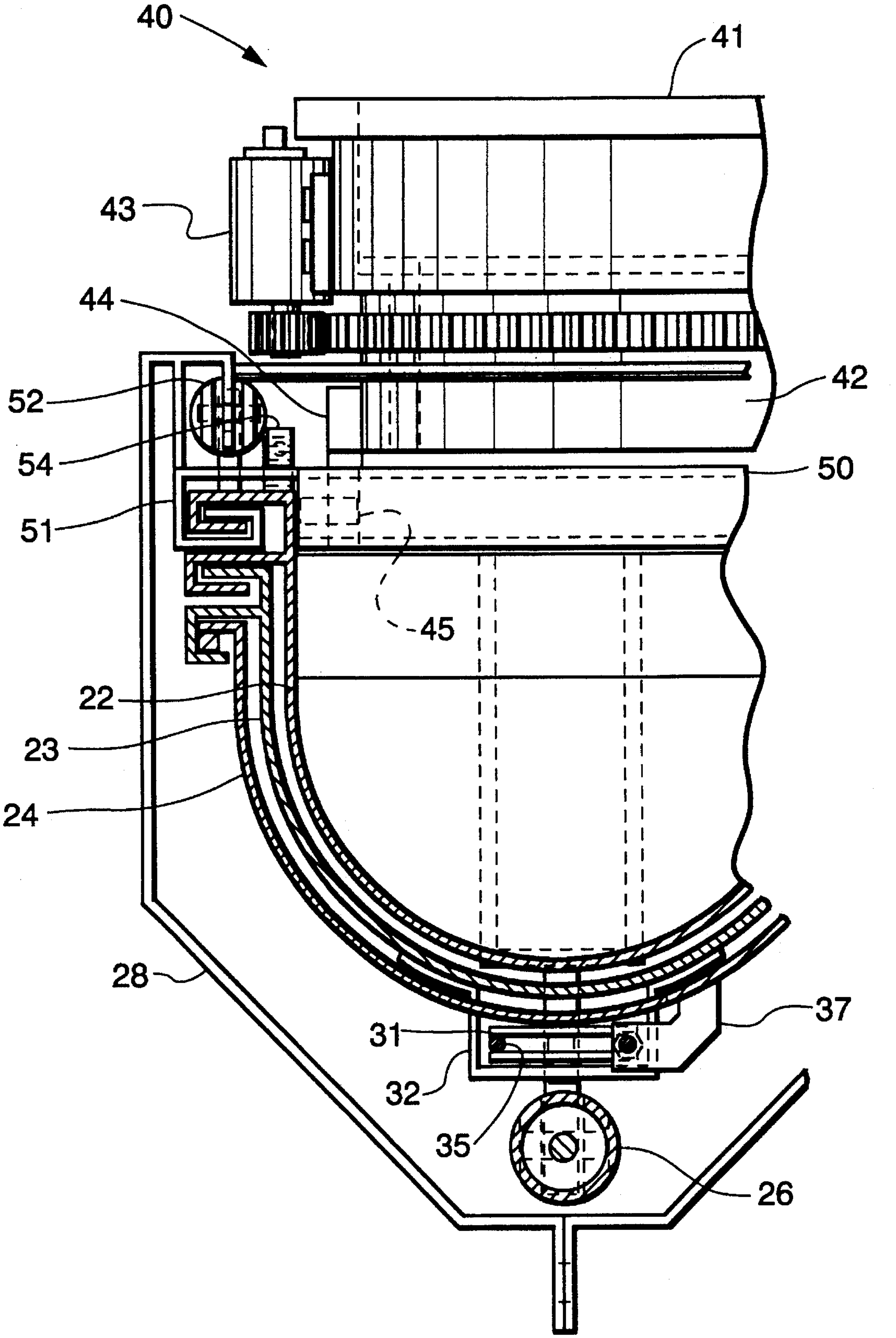
FIG. 14 is a partial cross-sectional view of the discharge chute apparatus taken along lines 14—14 of FIG. 13, portions of the discharge chute apparatus being broken away for purposes of clarity.

Referring now to FIGS. 9–11 and 14, the details of the telescopic discharge chute mechanism 20 can best be seen. The three-section telescopic chute assembly 21 is common to each of the embodiments described herein and is substantially infinitely extensible between a collapsed transport position shown in solid lines in the drawings to extended operative positions such as depicted in phantom lines in FIG. 6. The telescopic chute assembly 21 includes a first chute section 22 that slidably supports a second chute section 23, which in turn slidably supports a third chute section 24. As best seen in FIGS. 9, 10 and 14, the three chute sections 22, 23 and 24 nest to form a compact transport configuration having a minimum overall length on slightly longer than the length of the first chute section 22. The first chute section 22 is provided with a support bracket 28 connectable to a hydraulic lift cylinder 29 to control the vertical movement thereof as will be described in greater detail below.

The actuating mechanism 25 controls the extensible movement of the telescopic chute assembly 21. A hydraulic cylinder 26 lies beneath the chute assembly 21 and is anchored on the first chute section 22 at one end thereof. The extensible ram 27 of the hydraulic cylinder 26 is connected to the second chute section 23 such that an extension of the hydraulic cylinder 26 effects a sliding movement of the second chute section 23 over the first chute section 22.

A cable and pulley mechanism 30 effects the corresponding extensible movement of the third chute section 24 from the second chute section 23. The cable and pulley mechanism 30 includes a first pulley 31 rotatably supported from a mounting bracket 32 affixed to one end of the second chute section 23 and a second pulley 33 rotatably supported from a second mounting bracket 34 affixed to the remote distal end of the second chute section 23. A cable 35 is entrained around the pulleys 31, 33 and is anchored at both the first and second ends thereof 36, 37 to the third chute section 24 adjacent one another. The cable 35 is joined to the support bracket 28 by a clamp 39 to fix the cable 35 relative to the first chute section 22 on the opposite side of the pulleys 31, 33 from the anchor points 36, 37.

In operation, the actuating mechanism 25 effects extension and contraction of the telescopic chute assembly 21 through the corresponding extension and contraction of the hydraulic actuating cylinder 26. The extension of the ram 27 directly causes the extension of the second chute section 23 relative to the first chute section 22. As the second chute section 23 moves relative to the first chute section 22, the first and second pulleys 31, 33 move relative to the clamp 39 holding the cable 35 in a fixed location. The movement of the second pulley 33 away from the clamp 39, however, requires that the cable 35 be drawn from the opposite side of the second pulley 33, which causes the first and second anchor points 36, 37 to draw closer to the second pulley 33. This movement of the anchored ends 36, 37 of the cable 35 relative to the second pulley 33 causes the third chute section 24, to which the cable ends 36, 37 are anchored, to slide relative to the second chute section 23.

The retraction of the telescopic chute assembly 21 works similarly. The movement of the first pulley 31 away from the clamp 39, effected by the corresponding contraction of the ram 27 into the hydraulic cylinder 26, likewise draws the anchored ends 36, 37 of the cable 35 toward the first pulley 31 and, therefore, slidably retracts the third chute section 24 along the second chute section 23 toward the transport position. The arrangement of the hydraulic actuating cylinder 26 and the cable and pulley mechanism 30 is such that the full extension of the actuating cylinder 26 effects the complete permissible extension of the chute assembly 21. For structural integrity, both the first and second chute sections and the second and third chute sections have overlapping portions when fully extended. For chute sections that are approximately eight feet in length, it has been found that an overlapping portion two feet in length is adequate in this environment.

Figure 6:
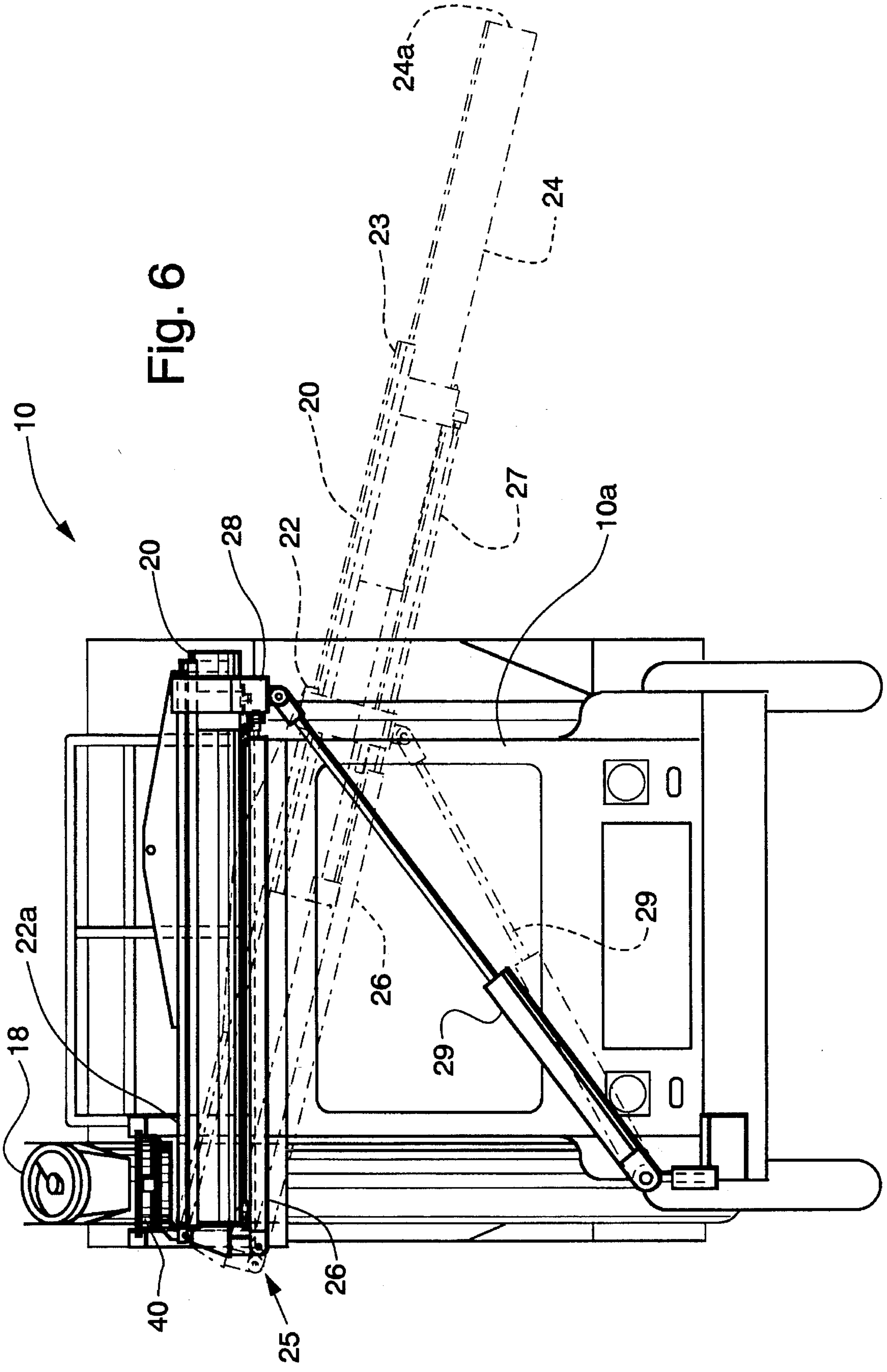
FIG. 6 is an enlarged front elevational view of the mobile concrete mixer corresponding to lines 6—6 of FIG. 2 depicting the transport position of the discharge chute apparatus, both the telescopic extensive movements and the vertical pivotal movements of the discharge chute apparatus being shown in phantom.
Figure 7:
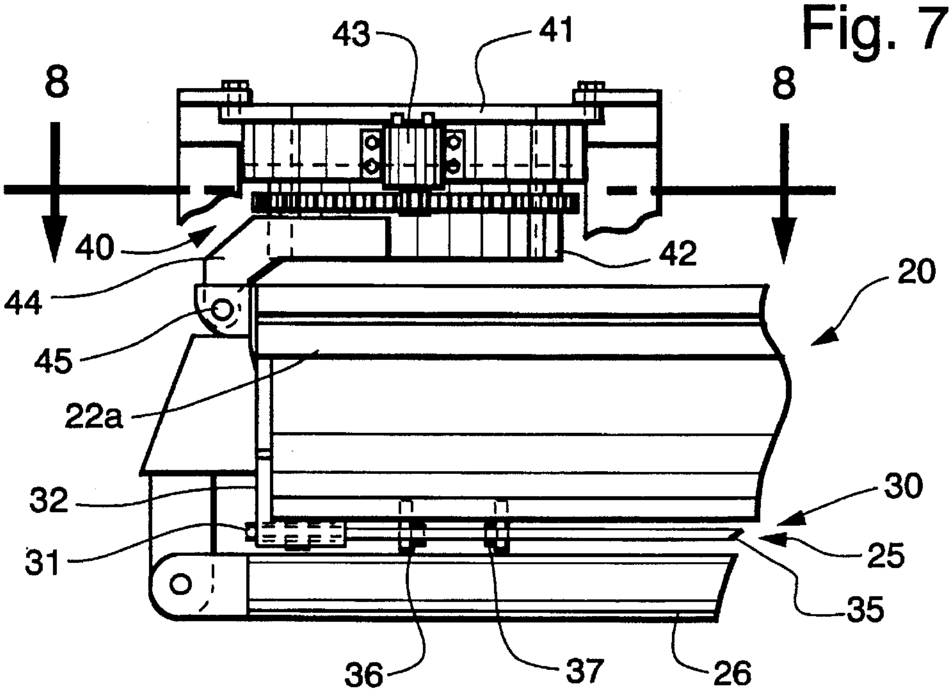
FIG. 7 is an enlarged partial front elevational view of the discharge chute apparatus shown in FIG. 6 to depict the pivotal mounting thereof.
Figure 8:
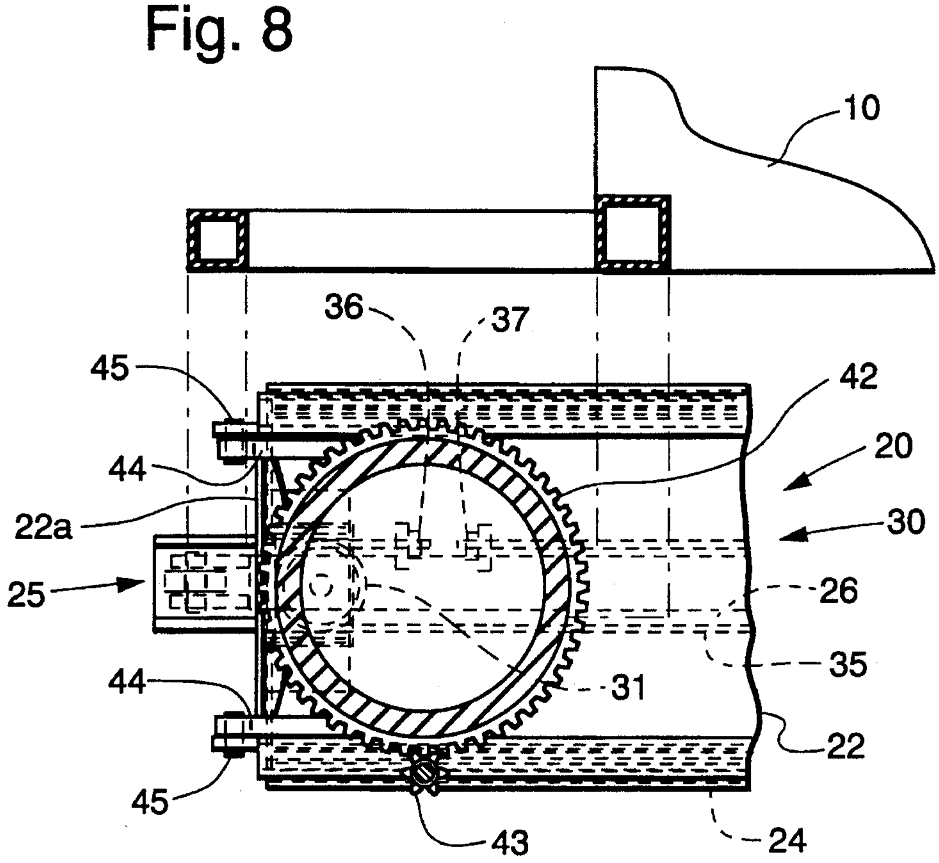
FIG. 8 is a partial cross-sectional view of the discharge chute apparatus taken along lines 8—8 of FIG. 7.

Referring now to FIGS. 6–8, the details of the first embodiment of the discharge chute mechanism 20 can best be seen. The first chute section 22 is pivotally connected to a swing ring mechanism 40 defining a fixed hopper 41 through which the concrete mixture discharged from the mixing auger 18 passes to be deposited into the reception end 22a of the first chute section 22. The rotatable lower portion 42 of the swing ring 40 is rotatable relative to the fixed upper hopper portion 41 through an actuating device 43, representatively depicted as a hydraulically operated motor, although one skilled in the art will readily understand that other equivalent actuating devices would be equally effective, such as a hydraulic cylinder and entrained cable mechanism.

The rotatable lower portion 42 carries a mounting member 44 to which the first chute section 22 can be pivotally connected to allow the entire chute assembly 21 to be pivotal about the generally horizontal pivot axis 45. The corresponding operation of the hydraulic lift cylinder 29 interconnecting the vehicle 10 and the support bracket 28 controls the pivotal movement of the chute assembly 21 about the pivot axis 45 and, thereby, controls the vertical location of the distal discharge end 24a of the third chute section 24 from which the concrete mixture received from the mixing auger 18 is deposited to the desired job site.

One skilled in the art will readily recognize the infinite selection of discharge locations for the distal discharge end 24a throughout the range of operation available for the discharge chute mechanism 20. The selective manipulation of the actuating device 43 to rotate the discharge chute mechanism within a generally horizontal plane within the limits imposed by the structural configuration of the vehicle 10, as depicted in phantom in FIG. 2, the hydraulic actuating cylinder 26 to selectively extend the chute assembly 21 between the collapsed transport position and the fully extended position, as depicted in phantom in FIG. 6, and the hydraulic lift cylinder 29 to control the vertical position of the discharge end 24a, as is also depicted in phantom in FIG. 6, combine to define the range of operation of the discharge chute mechanism 20 and provide a substantially infinite selection of discharge positions within the defined range of operation.

Referring now to FIGS. 3, 4, and 12–14, an alternative embodiment of the discharge chute mechanism 20 can best be seen. For mobile concrete trucks 10 of the type carrying a central front discharge drum 49, the telescopic chute assembly 21 can be mounted on a fixed slide mechanism 50. The slide mechanism 50 can be in the form of a pair of slide rails 51, as depicted in the drawings, supported at one end by the mounting member 44 and at the opposing end by the support bracket 38 to permit a generally vertical pivotal movement of the entire discharge chute mechanism 20 about the pivot axis 45. Alternatively, the fixed slide mechanism 50 could be formed as a stub chute section (not shown) on which the telescopic chute assembly 21 is slidably mounted in the same manner. The swing ring 40 is centrally located on the vehicle 10 to receive the concrete mixture from the drum 49 and funnel the mixture into the first chute section 22, or alternatively the stub chute section (not shown), which is pivotally connected to the rotatable lower portion 42 of the swing ring 40 via the slide mechanism 50 for generally vertical movement about the pivot axis 45.

Figure 13:
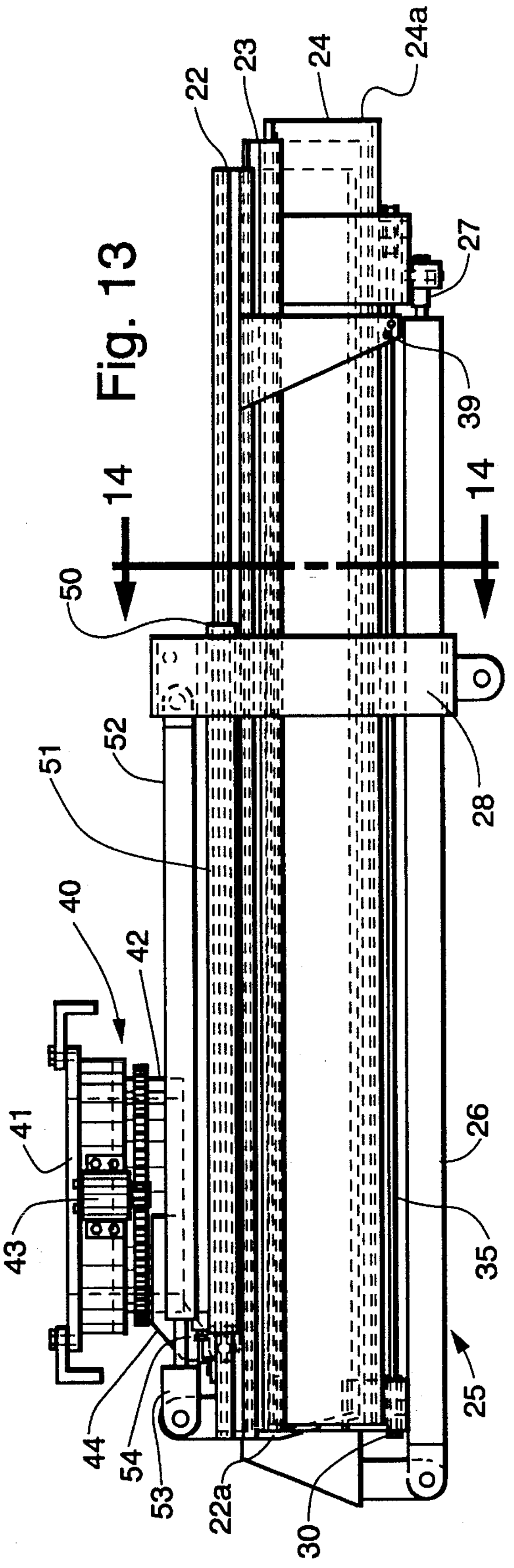
FIG. 13 is a front elevational view of the discharge chute apparatus of FIG. 12, but depicting the operative position thereof.

The first chute section 22 is slidably mounted on the slide rails 51 and is movable relative thereto through operation of a pair of hydraulic shifting cylinders 52 positioned on opposite sides of the swing ring 40. The shifting cylinders 52 are anchored on the support bracket 28, which is fixed to the slide rails 51, and have the rams 53 thereof connected to the receiving end 22a of the first chute section 22 such that the contraction of the shifting cylinders 52 cause a lateral shifting of the first chute section 22, and consequently the entire chute assembly 21, to extend outwardly of the slide mechanism 50 with the receiving end 22a of the first chute section 22, or alternatively the stub chute section (not shown), positioned beneath the drum 49 to receive the concrete mixture therefrom as depicted in FIG. 13.

Alternatively, a single shifting cylinder 52 can be located beneath the chute assembly 21 adjacent the actuating cylinder 26. By offsetting the actuating cylinder 26 to one side of the longitudinal center of the chute assembly 21, the shifting cylinder 52 can be positioned on the opposing side of the longitudinal centerline and interconnect the slide rails 51 and the support bracket 28 to effect movement of the chute assembly 21 relative to the slide rails 51. By keeping the hydraulic cylinders 26, 52 close to the longitudinal centerline of the chute assembly 21, the telescopically extending parts will not bind during the respective sliding movements.

Figure 12:
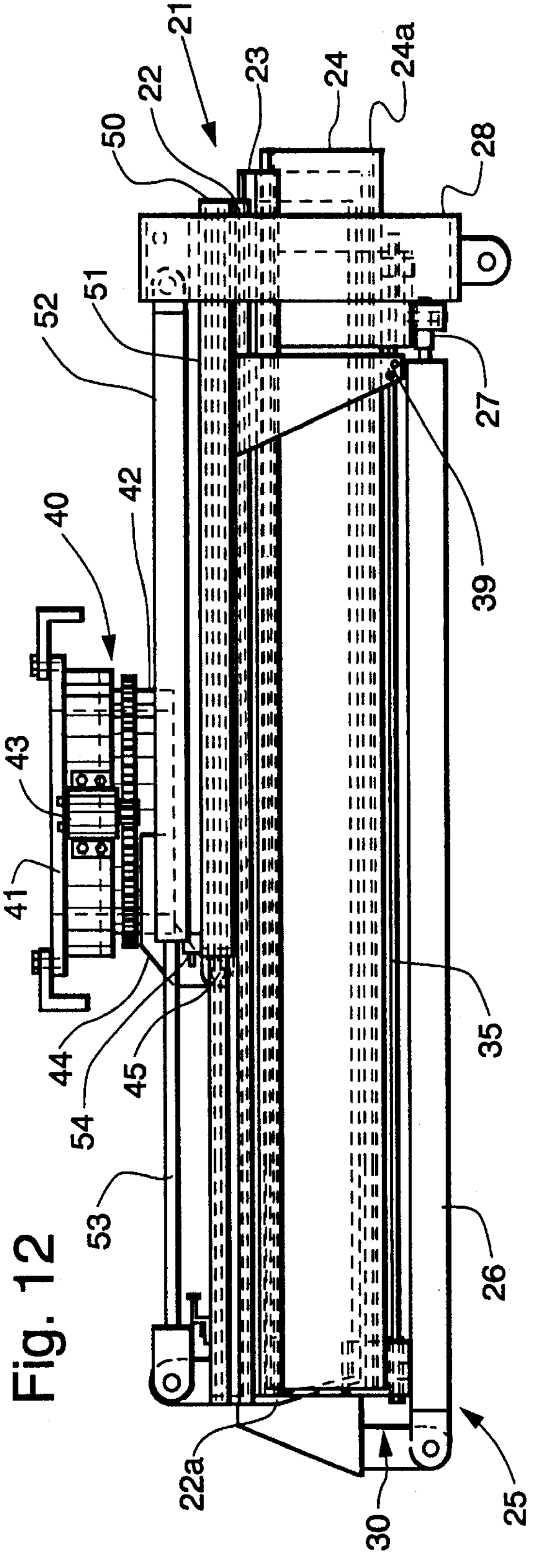
FIG. 12 is a front elevational view of the discharge chute apparatus similar to FIG. 6 but depicting the transport position of the embodiment shown in FIGS. 3 and 4.

In operation, the chute assembly 21 can be carried in a transport position depicted in FIG. 12 in which the full-sized chute sections 22, 23, 24 are centrally positioned within the exterior limits of the vehicle 10. Because of the resultant interference of structural components, neither the extension of the chute assembly 21 nor the rotation of the swing ring 40 can be effected so long as the chute assembly 21 is in the transport position. To assure that neither the actuating device 43 nor the actuating cylinder 26 can be operated until the chute assembly has been shifted to an acceptable position to prevent interference, a limit switch 55 is interposed between the slide mechanism 50 and the first chute section 22 to lock out the operation of both the actuating device 43 and the actuating cylinder 26 unless engaged by the shifting of the chute assembly 21 into an operative position.

While the range of operation of this second embodiment of the discharge chute mechanism 20 is limited to approximately 180° of rotation about the swing ring 40, the range of operation is symmetrical relative to the vehicle 10 and is also infinitely variable therewithin through the selective manipulation of the actuating device 43, the actuating cylinder 26 and the lift cylinder 29 to position the discharge end 24*a* of the third chute section 24 at the desired location.

Figure 5:
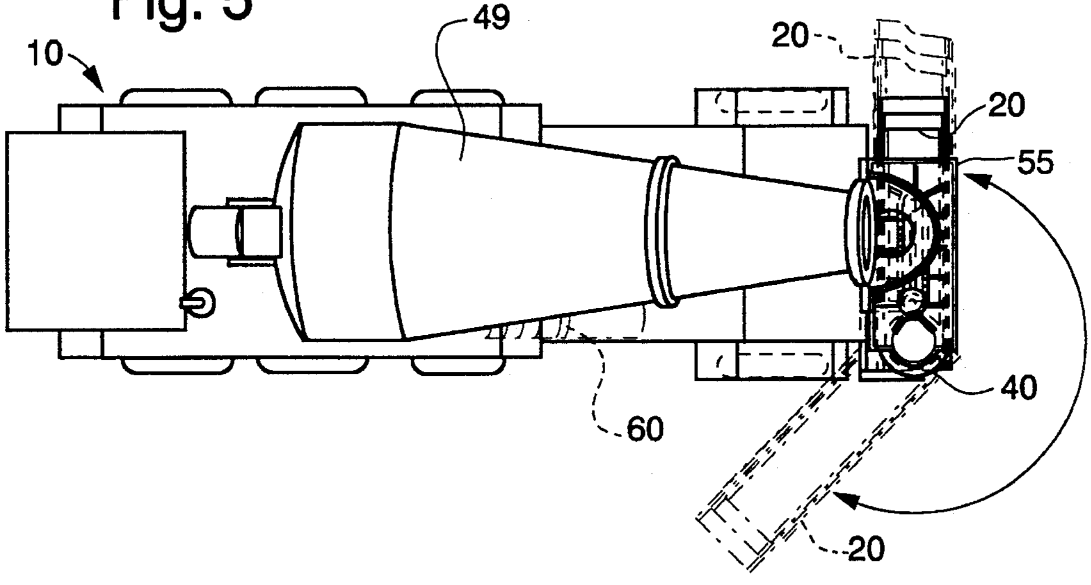
FIG. 5 is a top plan view of the mobile concrete mixer shown in FIG. 3, but incorporating an alternative embodiment of the discharge chute apparatus, the generally horizontal pivotal movements of the discharge chute apparatus, defining the range of operation thereof, being shown in phantom.
Figure 15:
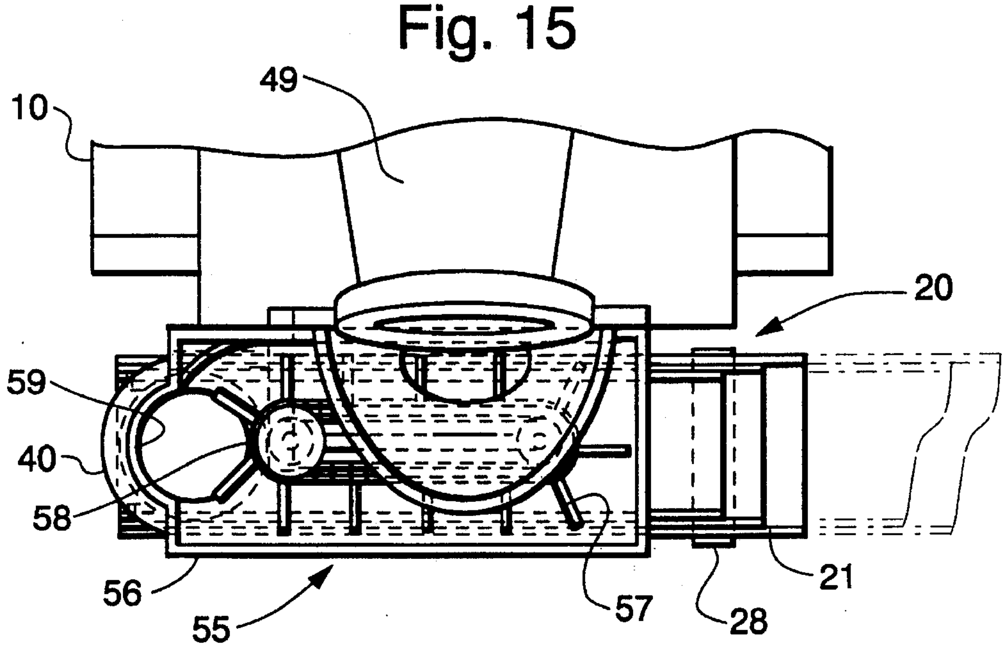
FIG. 15 is a top plan view of the alternative embodiment of the discharge chute apparatus shown in FIG. 5, the mobile concrete mixer being broken away for purposes of clarity, the telescopic movement of the discharge chute being representatively shown in phantom.
Figure 16:
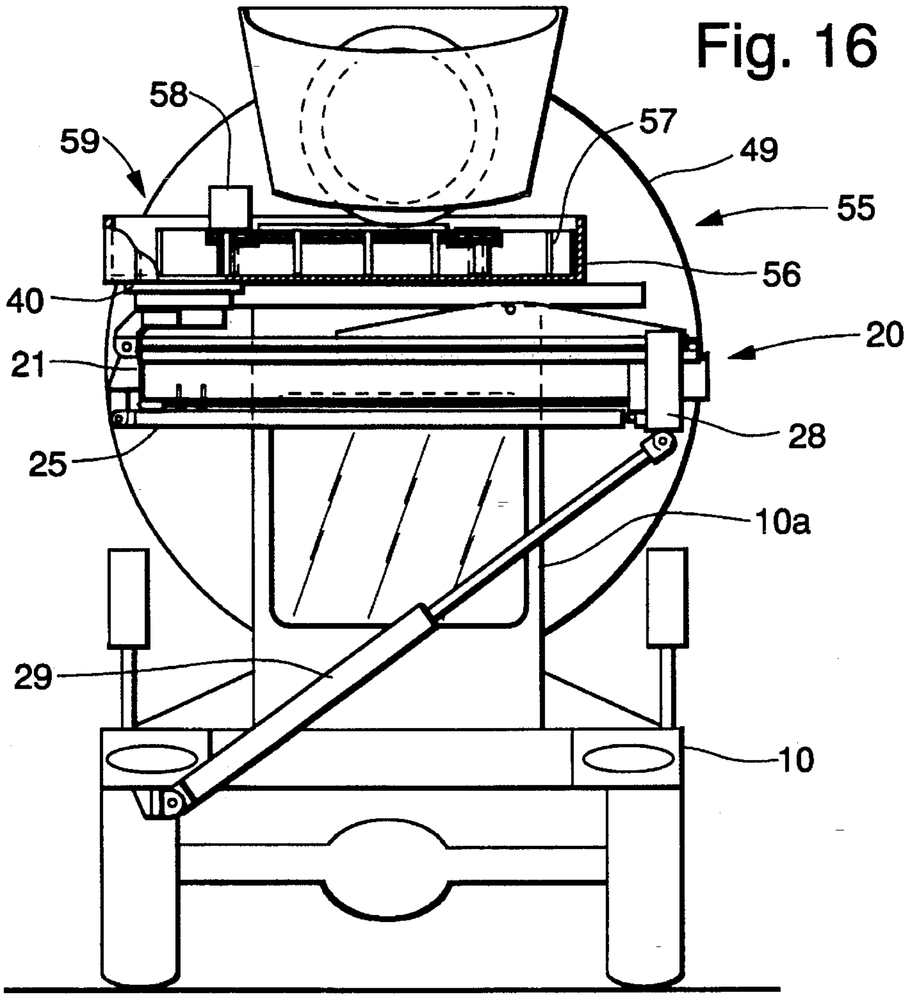
FIG. 16 is a front elevational view of the discharge chute apparatus shown in FIG. 15, the front wall portion of the cross conveyor being broken away to better depict the details of the cross conveyor.

Referring now to FIGS. 5, 15 and 16, an alternative embodiment of the telescopic discharge chute mechanism 20 operable with a mobile concrete mixer 10 having a central front discharge drum 49 can best be seen. The structural configuration of the swing ring 40 and telescopic chute assembly 21, as well as the operation thereof, remain as described above with respect to the mobile concrete mixer depicted in FIGS. 1, 2 and 6–8. To transfer the concrete mixture centrally discharged from the drum 49, the discharge chute mechanism 20 incorporates a cross conveyor 55 operable to receive the concrete mixture and convey the mixture to the upper hopper portion 41 of the swing ring 40. The cross conveyor 55 is simply an open-top box 56 having a rotatable chain and slat conveyor 57 operably housed therewithin and powered by a hydraulic motor 58 to push the concrete mixture into a discharge opening 59 aligned with the hopper 41.

In each embodiment of the discharge chute mechanism, the components, including the cross conveyor 55, are open to facilitate cleaning after the delivery of concrete thereby. The infinite variation of the positioning of the discharge end 24*a* within the respectively defined ranges of operation provides a greater flexibility for the delivery of concrete than has heretofore been known and substantially eliminated the need for the operator to constantly move the vehicle 10 from one position to another to change the delivery point of the concrete mixture. To further increase the range of operation of the discharge chute mechanism 20, the discharge end 24*a* of the third chute section 24 can be adapted to attached supplemental chute sections 60, such as representatively shown in phantom in FIGS. 3–5.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a mobile concrete mixer operable to deliver a concrete mixture to a selected location, said concrete mixer having opposing lateral sides defining a transverse width of said concrete mixer; a wheeled frame having forward and rearward ends and supporting an operator's cab at said forward end; mixer means for delivering said concrete mixture at said forward end; and discharge chute means pivotally supported about a generally vertical pivot axis at said forward end to receive said concrete mixture from said mixer means and to discharge said concrete mixture therefrom along a range of operation extending forwardly and laterally from said pivot axis, an improved discharge chute means comprising:

a plurality of chute sections extendable from said pivot axis in a predetermined manner, at least one of said chute sections having a length substantially equal to the transverse width of said concrete mixer, said discharge chute means being positionable in a transport position in which said at least one chute section is oriented generally transversely between said opposing sides of said concrete mixer.

2. The concrete mixer of claim 1 wherein said plurality of chute sections are arranged in a telescopic manner to be retracted into said transport position and to be extensible away from said pivot axis to vary the distance at which said concrete mixture is discharged therefrom within said range of operation.

3. The concrete mixer of claim 2 wherein said discharge chute means further includes a first actuator means operatively connected to said chute sections to effect the telescopic movement thereof.

4. The concrete mixer of claim 3 wherein said discharge chute means further includes a receiving means defining said pivot axis, said receiving means including a swing ring having a hopper portion supported from said frame to receive said concrete mixture from said mixer means and a rotatable portion supported from said hopper portion to mount said telescopic chute sections for a generally horizontal pivotal movement through said range of operation.

5. The concrete mixer of claim 4 wherein said receiving means is located at a lateral side of said concrete mixer, said at least one chute section being fixed to said rotatable portion of said swing ring for rotational movement about said pivot axis, the remainder of said chute sections being telescopic from said at least one chute section.

6. The concrete mixer of claim 5 wherein all of said chute sections have a length substantially equal to the transverse width of said concrete mixer.

7. The concrete mixer of claim 6 wherein said plurality of chute sections includes first, second and third chute sections, said first actuator means including a hydraulic cylinder interconnecting said first chute section and said second chute section slidably mounted on said first chute section to effect a telescopic sliding movement of said second chute section from said first chute section, said first actuator means further including a cable and pulley mechanism operatively associated with said hydraulic cylinder and said third chute section slidably mounted on said second chute section to effect a simultaneous telescopic sliding movement of said third chute section over said second chute section in response to a corresponding sliding movement of said second chute section on said first chute section.

8. The concrete mixer of claim 7 further comprising a cross conveyor extending transversely from a central position of said concrete mixer where said cross conveyor receives said concrete mixture directly from said mixer means to said receiving means at said lateral side of said concrete mixer whereby said concrete mixture is transversely conveyed to said discharge chute means.

9. The concrete mixer of claim 4 wherein said receiving means is located at a forward, central position of said concrete mixer to receive said concrete mixture directly from said mixer means, said at least one chute section being slidably mounted to a slide mechanism fixed to said swing ring for rotational movement about said pivot axis, the remainder of said chute sections being telescopic from said at least one chute section.

10. The concrete mixer of claim 9 wherein said slide mechanism is movable into a transversely extending orientation relative to a forward direction of travel of said concrete mixer to permit said at least one chute section to retract along said slide mechanism to an inoperative transport position wherein said at least one chute section is positioned between said lateral sides of said concrete mixer, said at least one chute section further being slidable over said slide mechanism to an operative position extending outwardly from said slide mechanism.

11. The concrete mixer of claim 10 wherein said plurality of chute sections includes first, second and third chute sections, said discharge chute means further includes a second actuator means operatively interconnecting said slide mechanism and said first chute section to effect the relative sliding movement therebetween, said first actuator means including a hydraulic cylinder interconnecting said first chute section and said second chute section slidably mounted on said first chute section to effect a telescopic sliding movement of said second chute section from said first chute section, said first actuator means further including a cable and pulley mechanism operatively associated with said hydraulic cylinder and said third chute section slidably mounted on said second chute section to effect a simultaneous telescopic sliding movement of said third chute section over said second chute section in response to a corresponding sliding movement of said second chute section on said first chute section.

12. The concrete mixer of claim 11 wherein said slide mechanism has a length substantially equal to one-half of said transverse width of said concrete mixer, all of the remainder of said chute sections having a length substantially equal to the transverse width of said concrete mixer.

13. A discharge chute mechanism for use in dispensing concrete mixture from a concrete mixer having opposing lateral sides defining a transverse width of said concrete mixer, a wheeled frame having forward and rearward ends and supporting an operator's cab at said forward end, and mixer means for delivering said concrete mixture at said forward end, comprising:

a receiving means to receive concrete and defining said pivot axis and being located at a lateral side of said concrete mixer, said receiving means being a swing ring having an upper hopper portion supported from said frame to receive said concrete mixture from said mixer means and a lower rotatable portion supported from said hopper portion to be rotatable about said pivot axis;

a plurality of chute sections arranged in a telescopic manner to be retracted into a transport position and to be extensible away from said pivot axis to vary the distance at which said concrete mixture is discharged therefrom within a range of operation extending forwardly and laterally from said pivot axis, at least one of said chute sections having a length substantially equal to the transverse width of said concrete mixer and being oriented generally transversely between said opposing lateral sides of said concrete mixer, said at least one chute section being fixed to said swing ring for rotational movement about said pivot axis, the remainder of said chute sections being telescopic from said at least one chute section; and a first actuator means operatively connected to said chute sections to effect the telescopic movement thereof.

14. The discharge chute mechanism of claim 13 wherein all of said chute sections have a length substantially equal to the transverse width of said concrete mixer.

15. The discharge chute mechanism of claim 14 further comprising a cross conveyor extending transversely from a central position of said concrete mixer where said cross conveyor receives said concrete mixture directly from said mixer means to said receiving means at said lateral side of said concrete mixer whereby said concrete mixture is transversely conveyed to said discharge chute means.

16. The discharge chute mechanism of claim 15 wherein said plurality of chute sections includes first, second and third chute sections, said first actuator means including a hydraulic cylinder interconnecting said first chute section and said second chute section slidably mounted on said first chute section to effect a telescopic sliding movement of said second chute section from said first chute section, said first actuator means further including a cable and pulley mechanism operatively associated with said hydraulic cylinder and said third chute section slidably mounted on said second chute section to effect a simultaneous telescopic sliding movement of said third chute section over said second chute section in response to a corresponding sliding movement of said second chute section on said first chute section.

17. A discharge chute mechanism for use in dispensing concrete mixture from a concrete mixer having opposing lateral sides defining a transverse width of said concrete mixer, a wheeled frame having forward and rearward ends and supporting an operator's cab at said forward end, and mixer means for delivering said concrete mixture at said forward end, comprising:

a rotation mechanism operable to rotate said discharge chute mechanism about a generally vertical pivot axis;

a slide mechanism mounted for movement with said rotation mechanism about said pivot axis;

a plurality of slidably movable chute sections arranged in a telescopic manner to be retracted into a transport position and to be extensible away from said pivot axis to vary the distance at which said concrete mixture is discharged therefrom within a range of operation extending forwardly and laterally from said pivot axis, a first of said movable chute sections being slidably mounted on said slide mechanism for rotational movement therewith about said pivot axis, the remainder of said movable chute sections being telescopic from said first chute section, said first chute section being movable on said slide mechanism into an inoperative transport position oriented generally transversely between said opposing lateral sides of said concrete mixer;

a first actuator means operatively connected to said movable chute sections to effect the telescopic movement thereof; and a second actuator means operatively interconnecting said slide mechanism and said first chute section to effect the relative sliding movement therebetween.

18. The discharge mechanism of claim 17 wherein said slide mechanism is movable into a transversely extending orientation to permit said first chute section to retract along said side mechanism to said inoperative transport position wherein said first chute section is positioned between said lateral sides of said concrete mixer, said first chute section further being slidable over said slide mechanism to an operative position extending outwardly from said slide mechanism.

19. The discharge chute mechanism of claim 18 further comprising a receiving means located at a forward, central position of said concrete mixer to receive said concrete mixture directly from said mixer means, said receiving means defining a swing ring having a hopper supported from said frame to receive said concrete mixture from said mixer means and a rotatable portion supported from said hopper to be rotatable about said pivot axis, said slide mechanism being mounted to said rotatable portion.

20. The discharge chute mechanism of claim 19 wherein said first actuator means includes a hydraulic cylinder interconnecting said first chute section and a second of said movable chute sections slidably mounted on said first chute section to effect a telescopic sliding movement of said second chute section from said first chute section, said first actuator means further including a cable and pulley mechanism operatively associated with said hydraulic cylinder and a third of said movable chute sections slidably mounted on said second chute section to effect a simultaneous telescopic sliding movement of said third chute section over said second chute section in response to a corresponding sliding movement of said second chute section on said first chute section, said second actuator means including a hydraulic cylinder interconnecting said slide mechanism and said first chute section to affect selective movement of said first chute section between an operative position and said inoperative position.

* * * * *